(12) United States Patent
Bozic

(10) Patent No.: US 10,799,968 B2
(45) Date of Patent: Oct. 13, 2020

(54) SAW BLADE FOR A MACHINE TOOL

(75) Inventor: Milan Bozic, Solothurn (CH)

(73) Assignee: Robert Bosch GmbH, Stuttgart (DE)

( * ) Notice: Subject to any disclaimer, the term of this patent is extended or adjusted under 35 U.S.C. 154(b) by 662 days.

(21) Appl. No.: 14/342,492

(22) PCT Filed: Jul. 16, 2012

(86) PCT No.: PCT/EP2012/063871
§ 371 (c)(1),
(2), (4) Date: Jun. 6, 2014

(87) PCT Pub. No.: WO2013/034344
PCT Pub. Date: Mar. 14, 2013

(65) Prior Publication Data
US 2014/0325855 A1   Nov. 6, 2014

(30) Foreign Application Priority Data

Sep. 7, 2011 (DE) .................. 10 2011 082 228

(51) Int. Cl.
*B23D 61/00* (2006.01)
*B23D 51/00* (2006.01)
*B27B 19/00* (2006.01)

(52) U.S. Cl.
CPC .......... *B23D 61/006* (2013.01); *B23D 51/00* (2013.01); *B27B 19/006* (2013.01); *Y10T 83/929* (2015.04); *Y10T 83/9319* (2015.04); *Y10T 83/9454* (2015.04); *Y10T 83/9457* (2015.04)

(58) Field of Classification Search
CPC .. B23D 61/006; B23D 51/006; B27B 19/006; Y10T 83/9319; Y10T 83/9362
See application file for complete search history.

(56) References Cited

U.S. PATENT DOCUMENTS

| 3,554,197 A * | 1/1971 | Dobbie ................. B23Q 5/027 30/392 |
| 3,943,934 A * | 3/1976 | Bent ......................... B27B 5/32 30/339 |
| 6,723,101 B2 | 4/2004 | Fletcher et al. |
| 2002/0116023 A1 | 8/2002 | Fletcher et al. |
| 2004/0243136 A1 * | 12/2004 | Gupta .................... A61B 17/14 606/82 |
| 2008/0027449 A1 * | 1/2008 | Gundlapalli ....... A61B 17/1613 606/82 |

(Continued)

FOREIGN PATENT DOCUMENTS

| CA | 2203589 A1 | 10/1997 |
| DE | 2427716 B1 * | 11/1975 ............. A61B 17/14 |

(Continued)

OTHER PUBLICATIONS

International Search Report corresponding to PCT Application No. PCT/EP2012/063871, dated Oct. 2, 2012 (German and English language document) (6 pages).

*Primary Examiner* — Jennifer B Swinney
(74) *Attorney, Agent, or Firm* — Maginot, Moore & Beck LLP

(57) ABSTRACT

A saw blade includes a blade base with an arcuate cutting edge. The cutting edge is curved to a lesser extent than a circular arc with a radius that corresponds to the distance between the axis of rotation of the saw blade and the cutting edge.

19 Claims, 3 Drawing Sheets

(56) References Cited

U.S. PATENT DOCUMENTS

2008/0190259 A1* 8/2008 Bohne .................... B24B 23/04
83/666
2010/0052269 A1* 3/2010 Zaiser .................... B24B 23/04
279/144
2010/0288099 A1 11/2010 Steiger

FOREIGN PATENT DOCUMENTS

| DE | 3221855 A1 * | 5/1983 | ............. A61B 17/14 |
| DE | 3833735 A1 * | 4/1989 | ........... B23D 61/006 |
| DE | 203 08 797 U1 | 10/2003 | |
| DE | 20 2011 108 736 U1 | 6/2012 | |
| EP | 0 695 607 A1 | 2/1996 | |
| EP | 2 251 162 A1 | 11/2010 | |
| EP | 2364806 A1 * | 9/2011 | ........... B23D 61/006 |
| WO | 03/028966 A2 | 4/2003 | |
| WO | 2005/063429 A1 | 7/2005 | |

* cited by examiner

SAW BLADE FOR A MACHINE TOOL

This application is a 35 U.S.C. § 371 National Stage Application of PCT/EP2012/063871, filed on Jul. 16, 2012, which claims the benefit of priority to Serial No. DE 10 2011 082 228.3, filed on Sep. 7, 2011 in Germany, the disclosures of which are incorporated herein by reference in their entirety.

BACKGROUND

The disclosure relates to a saw blade, in particular a rotationally oscillating saw blade for a power tool.

DE 203 08 797 U1 discloses a saw blade for a saw having a rotationally oscillating drive movement. The saw blade has an approximately rectangular saw-blade body, which is formed integrally with a fastening section, into which a cutout for receiving the tool shaft of the saw is introduced. On the side remote from the cutout, the saw-blade body is provided with a cutting edge which is used for workpiece machining and is provided, as a rectilinear edge, with cutting teeth.

In the case of rectilinear cutting edges, the problem can occur that the corner regions can catch in the material of the workpiece during machining. When the direction of rotation is reversed, only the corner region is in contact with the workpiece, and so the cutting edge is subjected to irregular loading.

EP 0 695 607 A1 describes a saw blade for a bone saw having a rotationally oscillating drive. The saw blade is likewise formed in an approximately rectangular manner and has a cutting edge that is curved in the form of a part-circle and has cutting teeth, wherein the radius of the cutting edge corresponds to the distance from the rotation axis. Although the embodiment of the cutting edge in the form of a part-circle results in more regular loading of the cutting teeth, when the direction of rotation is changed, the chips that occur during machining are not removed optimally from the cutting region.

SUMMARY

The disclosure is based on the problem of configuring a saw blade having a cutting edge in the form of a part-circle such that the saw blade has a long useful life and chips that arise during workpiece machining are removed better.

This problem is solved by a rotationally oscillating saw blade for a power tool having the features of the disclosure. The dependent claims specify expedient developments.

The saw blade according to the disclosure can be used in the power tool, in particular in portable power tools, which are provided with a rotationally oscillating drive, such that the saw blade executes an oscillating rotational movement during operation. The saw blade has a saw-blade body which is provided with an arcuate cutting edge, in particular a cutting edge in the form of a part-circle or of a polygon. The saw-blade body is circular-segment-shaped or rectangular or approximately rectangular, for example trapezoidal. The saw-blade body is connected to a fastening section, via which the saw blade is releasably connected to the tool shaft of the power tool. The fastening section is formed either integrally with the saw-blade body or is configured as a separate part which, however, is firmly connected to the saw-blade body. If appropriate, the saw blade is offset, such that the saw-blade body and the fastening section are located in planes that are offset in parallel. However, a configuration in which the saw-blade body and the fastening section are located in a common plane is also suitable. Advantageously, in any case both the saw-blade body and the fastening section are configured as planar or plate-like components.

The arcuate cutting edge is less curved than a circular arc having a radius which corresponds to the distance between the rotation axis of the saw blade and the cutting edge. In the case of a cutting edge in the form of a part-circle, the radius of the cutting edge on the saw-blade body is greater than the distance between the rotation axis of the saw blade and the cutting edge. The rotation axis passes through the fastening section, in particular through the fastening cutout in the fastening section, the tool shaft passing through said fastening cutout in the mounted state; in the mounted state, the rotation axis of the saw blade coincides with the shaft axis of the tool shaft.

The cutting edge in the form of a part-circle thus has a larger radius than known configurations. The larger radius compared with the distance between the rotation axis of the saw blade and the cutting edge results in a wedge- or gap-shaped clearance arising between the cutting teeth and the workpiece when the direction of rotation is reversed during workpiece machining, it being possible for chips that arise during workpiece machining to be removed more easily via said clearance. Nevertheless, more regular loading of the cutting edge is obtained than in the case of rectilinear cutting edges; the loading corresponds approximately to that with the form of a part-circle, the mid-point of the radius of which coincides with the rotation axis of the saw blade. This results overall in the advantage of an increased service life and better removal of chips.

The cutting edge is advantageously configured in a symmetrical manner with respect to a center axis which passes longitudinally through the saw blade, such that the mid-point of the radius of the cutting edge is located on the center axis. If appropriate, however, asymmetrical configurations of the cutting edge, in which the mid-point of the radius is located at a lateral distance from the center axis, may also be suitable.

Expediently, saw teeth are arranged on the cutting edge, wherein the radius can relate both to the tooth root and to the tooth tips.

The radius of the cutting edge is for example dimensioned such that the mid-point is located outside the fastening section. The radius of the cutting edge is for example 10%, 20% or 30% larger than the distance between the rotation axis and the cutting edge.

In principle, instead of a cutting edge in the form of a part-circle, a cutting edge in the form of a polygon, which is likewise configured in an arcuate manner overall, is also suitable. In this case, too, the arcuate cutting edge is less curved than a circular arc having a radius which corresponds to the distance between the rotation axis of the saw blade and the cutting edge, such that, as in the case of the cutting edge in the form of a part-circle, the advantage is achieved that a wedge- or gap-shaped clearance arises between the cutting teeth and the workpiece when the direction of rotation is reversed during workpiece machining, it being possible for chips that arise during workpiece machining to be removed more easily via said clearance.

The saw blade is preferably configured as a plunge-cut saw blade.

Further advantages and expedient embodiments can be gathered from the further claims, the description of the figures and the drawings, in which:

In the figures, identical components are provided with identical reference signs.

Figure 1:
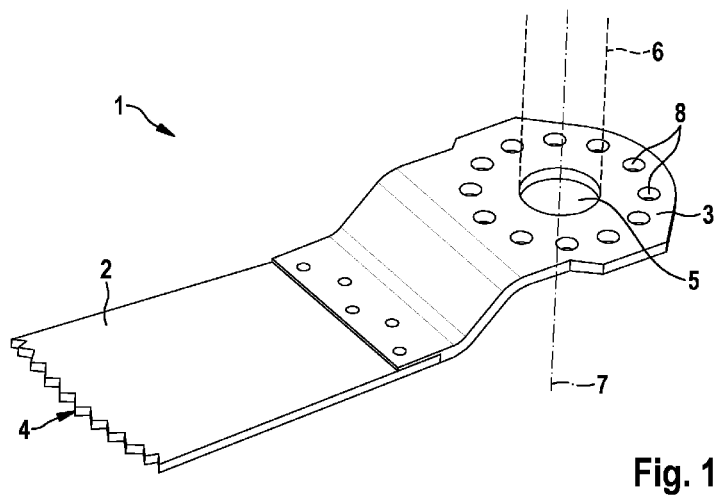
FIG. 1 shows a perspective view of a saw blade having a rectangular saw-blade body, the front edge of which is embodied as a cutting edge in the form of a part-circle, and having a fastening section for fastening to a tool shaft.
Figure 3:
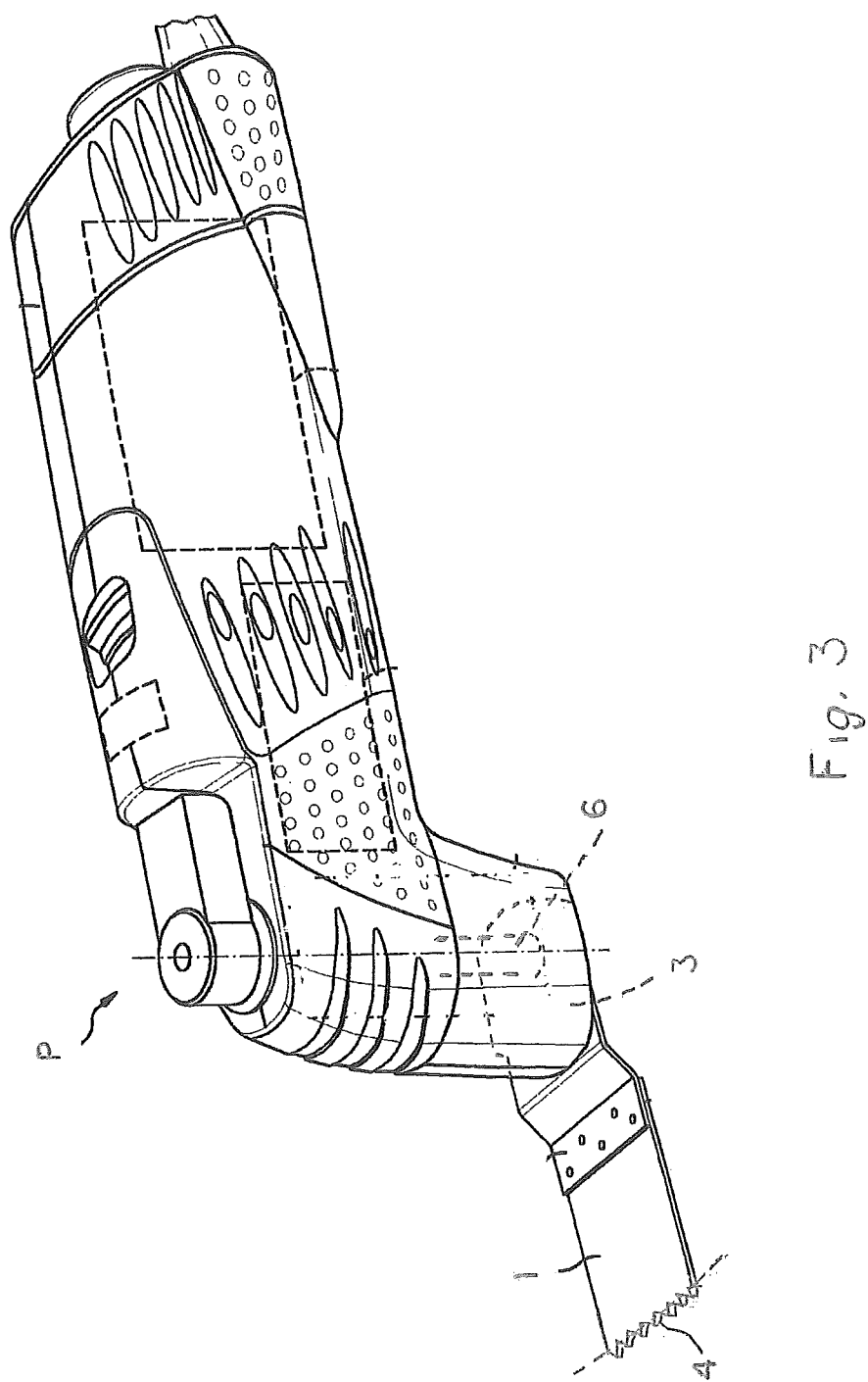
FIG. 3 is a perspective view of the saw blade of FIG. 1 fastened to a power tool.

FIG. 1 illustrates a saw blade 1, configured as a plunge-cut saw blade, for a portable power tool having a rotationally oscillating drive. FIG. 3 shows an exemplary power tool P with a tool shaft 6, with the saw blade 1 fastened to the power tool. The saw blade 1 comprises a saw-blade body 2, which is configured in a plate-shaped manner with an approximately rectangular, optionally slightly trapezoidal geometry, and a fastening section 3, via which the saw blade 1 is connected to a tool shaft 6 of the portable power tool. The front edge, remote from the fastening section 3, of the saw-blade body 2 is configured as a cutting edge 4 having cutting teeth.

A central fastening cutout 5 for receiving the tool shaft 6 is introduced into the substantially disk-shaped fastening section 3. Fastening takes place by means of a suitable fastening device, wherein, in order to transmit torque, latching openings 8 arranged in an annular manner around the fastening cutout 5 are introduced into the fastening section 3, latching protuberances of the fastening device projecting into the latching openings 8 in the mounted state, in order to transmit the torque from the tool shaft to the saw blade 1.

The shaft axis of the tool shaft 6 coincides in the mounted state with the rotation axis 7 through the fastening cutout 5 in the fastening section 3. During workpiece machining, the saw blade 1 is pivoted in an oscillating manner about the rotation axis 7.

Both the saw-blade body 2 and the fastening section 3 are formed in an intrinsically planar manner. Since the saw blade 1 is formed in an offset manner, the saw-blade body 2 and the fastening section 3 are located in planes that are offset in parallel. The saw-blade body 2 and the fastening section 3 are configured as separate components which are connected firmly together via a connecting section.

Figure 2:
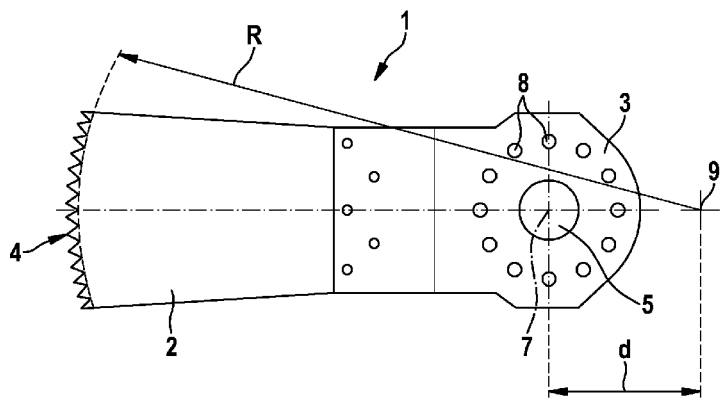
FIG. 2 shows the saw blade in plan view.

The cutting edge 4 having the cutting teeth is in the form of a part-circle. The radius R of the cutting edge 4 is illustrated in FIG. 2. The mid-point 9 of the radius R of the cutting edge 4 is located outside the fastening section 3. The radius R is greater than the distance between the rotation axis 7, which passes through the fastening cutout 5, and the cutting edge 4. On account of the enlarged radius R of the cutting edge 4, when the direction of rotation is reversed, clearances arise between the cutting edge 4 and the workpiece to be processed during the rotationally oscillating movement of the saw blade 1, the removal of chips being improved via said clearances.

Figure 4:
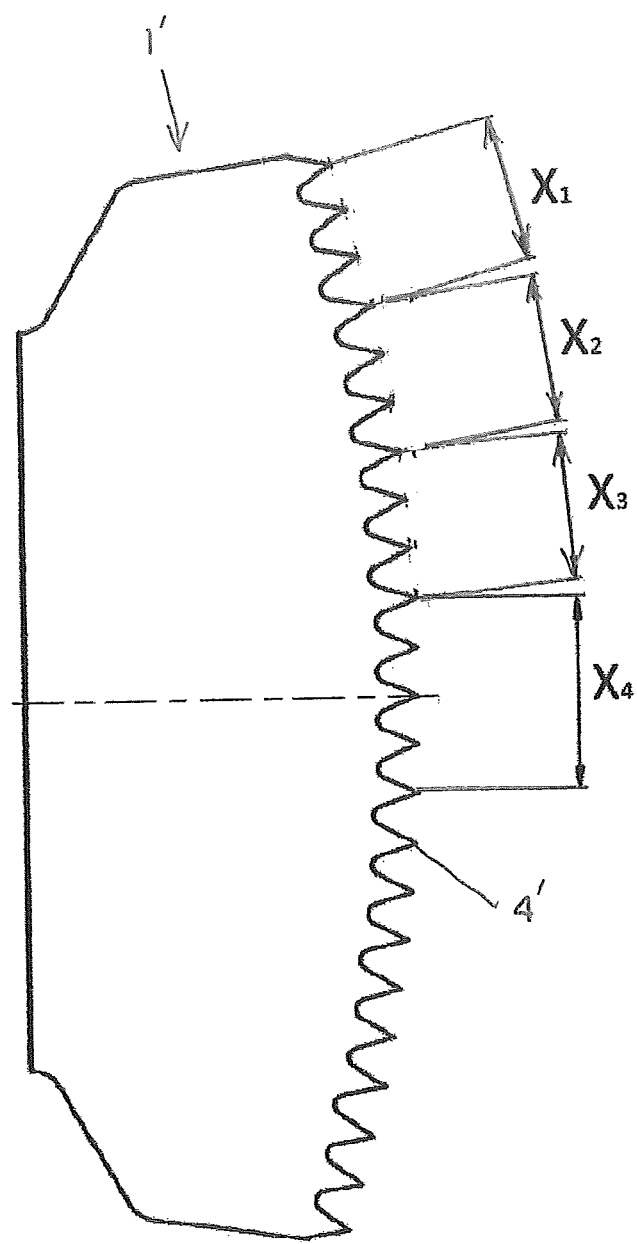
FIG. 4 shows a portion of a saw blade in plan view having a cutting edge in the form of a polygon.

FIG. 4 shows the cutting edge portion of a saw blade 1' in which the cutting edge 4' is in the form of a polygon. The cutting edge 4' thus includes generally linear segments X1, X2, . . . Xn that form the polygon shape. The segments Xn follow the arc of the radius R illustrated in FIG. 2.

The radius R is significantly larger than the distance between the rotation axis 7 and the cutting edge 4. For example, the radius R is 1.25 times the distance between the rotation axis 7 and the cutting edge 4. However, smaller or even larger values, for example 1.5 times or 2 times, are also suitable.

The invention claimed is:

1. A saw blade, comprising:
   a saw blade body that is circular-segment-shaped, trapezoidal or rectangular, the saw-blade body having an arcuate cutting edge,
   wherein the arcuate cutting edge is in the form of a part-circle having a cutting edge radius that is greater than a radius of a circular arc that corresponds to a distance between a rotation axis of the saw blade and the arcuate cutting edge, wherein the cutting edge radius is 1.25-2 times greater than said radius of the circular arc.

2. The saw blade as claimed in claim 1, wherein the radius of the cutting edge originates from an origin that is located on a center axis, the center axis extending through the saw blade between the rotation axis and the arcuate cutting edge.

3. The saw blade as claimed in claim 2, wherein a fastening cutout configured to receive a tool shaft is formed into a fastening section connected to the saw-blade body, and wherein the rotation axis extends through the fastening cutout.

4. The saw blade as claimed in claim 3, wherein the origin of the radius of the cutting edge is located outside the fastening section.

5. The saw blade as claimed in claim 3, wherein the fastening section is formed integrally with the saw-blade body.

6. The saw blade as claimed in claim 1, wherein the cutting edge is in the form of a polygon.

7. The saw blade as claimed in claim 1, wherein the cutting edge has cutting teeth.

8. The saw blade as claimed in claim 1, wherein the saw blade is configured as a rotationally oscillating saw blade for a power tool, and wherein the power tool is configured as a portable power tool.

9. The saw blade as claimed in claim 1, further comprising:
   a fastening section at an end of the saw blade opposite the arcuate cutting edge that is configured to receive a tool shaft,
   wherein the rotation axis is defined in the fastening section, and
   wherein the fastening section includes a number of latching openings configure to receive at least one latching protuberance of a fastening device associated with a tool shaft, in which the at least one latching protuberance projects into at least one of said number of latching openings to transmit torque from the tool shaft to the saw blade.

10. The saw blade as claimed in claim 9, wherein:
    said fastening section defines a fastening cutout configured to receive a tool shaft; and
    said number of latching openings includes a plurality of latching openings arranged in an annular manner around said fastening cutout.

11. A power tool, comprising:
    a saw blade including:
    a saw-blade body that is circular-segment-shaped, trapezoidal or rectangular, the saw-blade body having an arcuate cutting edge,
    wherein the arcuate cutting edge is in the form of a part-circle having a cutting edge radius that is greater than a radius of a circular arc that corresponds to a distance between a rotation axis of the saw blade and the arcuate cutting edge, wherein the cutting edge radius is 1.25-2 times greater than said radius of the circular arc.

12. The power tool as claimed in claim 11, wherein the power tool is configured as a portable power tool.

13. The power tool as claimed in claim 11, wherein the saw blade is configured as a rotationally oscillating saw blade.

14. The power tool as claimed in claim 11, further comprising:
a rotary tool shaft; and
the saw blade including a fastening section at an end of the saw blade opposite the arcuate cutting edge that is configured to receive the tool shaft, wherein the rotation axis is defined in the fastening section.

15. The power tool as claimed in claim 14, wherein:
the tool shaft includes a fastening device including at least one latching protuberance; and
said fastening section includes a number of latching openings configure to receive said at least one latching protuberance projecting into at least one of said number of latching openings to transmit torque from the tool shaft to the saw blade.

16. The power tool as claimed in claim 15, wherein:
said fastening section defines a fastening cutout configured to receive the tool shaft; and
said number of latching openings includes a plurality of latching openings arranged in an annular manner around said fastening cutout.

17. A rotationally oscillating saw blade for a power tool, comprising:

a fastening section at one end of the saw blade that is configured to receive a rotary tool shaft and defining a rotation axis for oscillation of the saw blade; and
a saw-blade body that is circular-segment-shaped, trapezoidal or rectangular, the saw-blade body affixed to the fastening section, the saw-blade body having an arcuate cutting edge at an end of the saw blade opposite the fastening section,
wherein the arcuate cutting edge is in the form of a part-circle having a cutting edge radius that is greater than a radius of a circular arc that corresponds to a distance between the rotation axis of the saw blade and the arcuate cutting edge, and
wherein the radius of the cutting edge originates from an origin that is located outside the fastening section.

18. The saw blade as claimed in claim 17, wherein the fastening section includes a number of latching openings configure to receive at least one latching protuberance of a fastening device associated with the tool shaft, in which the at least one latching protuberance projects into at least one of said number of latching openings to transmit torque from the tool shaft to the saw blade.

19. The saw blade as claimed in claim 18, wherein:
said fastening section defines a fastening cutout configured to receive a tool shaft; and
said number of latching openings includes a plurality of latching openings arranged in an annular manner around said fastening cutout.

\* \* \* \* \*